(12) United States Patent
Ashok et al.

(10) Patent No.: US 8,458,688 B2
(45) Date of Patent: Jun. 4, 2013

(54) VIRTUAL MACHINE MAINTENANCE WITH MAPPED SNAPSHOTS

(75) Inventors: Rohith K. Ashok, Apex, NC (US); Matt R. Hogstrom, Cary, NC (US); Jose Ortiz, Raleigh, NC (US); Aaron K. Shook, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 12/648,052

(22) Filed: Dec. 28, 2009

(65) Prior Publication Data

US 2011/0161947 A1 Jun. 30, 2011

(51) Int. Cl.
G06F 9/44 (2006.01)
G06F 9/445 (2006.01)
G06F 9/455 (2006.01)

(52) U.S. Cl.
CPC .. *G06F 8/65* (2013.01); *G06F 8/61* (2013.01); G06F 9/45533 (2013.01)
USPC .............................. 717/169; 717/175; 718/1

(58) Field of Classification Search
None
See application file for complete search history.

(56) References Cited

U.S. PATENT DOCUMENTS

| 6,631,521 | B1* | 10/2003 | Curtis ........................... 717/175 |
| 6,687,902 | B1* | 2/2004 | Curtis et al. ................. 717/175 |
| 7,181,739 | B1* | 2/2007 | Harral et al. ................. 717/176 |
| 7,185,071 | B2 | 2/2007 | Berg et al. |
| 7,437,764 | B1* | 10/2008 | Sobel et al. ....................... 726/25 |
| 7,529,897 | B1 | 5/2009 | Waldspurger et al. |
| 7,664,982 | B2* | 2/2010 | Mue et al. ....................... 714/5.1 |
| 7,975,264 | B2* | 7/2011 | Sriram et al. ................. 717/169 |
| 8,065,672 | B2* | 11/2011 | Sriram et al. ................. 717/169 |
| 8,166,477 | B1* | 4/2012 | Tormasov ........................ 718/1 |
| 2004/0030768 | A1* | 2/2004 | Krishnamoorthy et al. .. 709/223 |
| 2007/0094659 | A1* | 4/2007 | Singh et al. ....................... 718/1 |
| 2008/0155302 | A1* | 6/2008 | Mue et al. ........................ 714/2 |
| 2008/0155526 | A1* | 6/2008 | Gokhale ....................... 717/169 |
| 2009/0144515 | A1 | 6/2009 | Benari |
| 2009/0217255 | A1* | 8/2009 | Troan ........................... 717/168 |
| 2010/0205421 | A1* | 8/2010 | Campbell et al. ................. 713/2 |
| 2010/0275200 | A1* | 10/2010 | Radhakrishnan et al. ........ 718/1 |
| 2011/0258441 | A1* | 10/2011 | Ashok et al. .................. 713/168 |

OTHER PUBLICATIONS

WMware, "Administration Guide: Update Manager" [online], Jul. 2009 [retrieved Aug. 24, 2012], Retrieved from Internet: <http://www.vmware.com/pdf/vi3_vum_10_admin_guide.pdf>, pp. 1—Update-8 [whole document].*

(Continued)

*Primary Examiner* — Don Wong
*Assistant Examiner* — Todd Aguilera
(74) *Attorney, Agent, or Firm* — Law Office of Jim Boice (57) ABSTRACT

A computer-implemented method, system and/or computer program product manage software maintenance software in a computer system. A first snapshot is taken of first system states of a computer system. The first snapshot is mapped to a first maintenance software, which is further mapped to a specific user. The computer system is instructed to install the first maintenance software in response to an installation request from the specific user. If the specific user subsequently requests that the first maintenance software be removed from the computer system, then the mappings of the first snapshot and the first maintenance software are used to revert the computer system back to the first system states.

20 Claims, 3 Drawing Sheets

OTHER PUBLICATIONS

D. Davis, "What is a VMware Snapshot?" January 8, 2009, pp. 1-2, http://www.petri.co.il/virtual_vmware_snapshot_htm.

A. Desai, "VMware Center TM Site Recovery Manager Performance and Best Practices for Performance: Architecting Your Recovery Plan to Minimize Recovery Time", 2009, pp. 1-16, http://www.vmware.com/pdf/Perf_SiteRecoveryManager10_Best-Practices.pdf.

"VMware vCenter Lab Manager", pp. 1-3, http://www.vmware.com/products/labmanager.

* cited by examiner

VIRTUAL MACHINE MAINTENANCE WITH MAPPED SNAPSHOTS

BACKGROUND

The present disclosure relates to the field of computers, and specifically to virtual machine computers. Still more particularly, the present disclosure relates to software maintenance on virtual machine computers.

BRIEF SUMMARY

A computer-implemented method, system and/or computer program product manage software maintenance software in a computer system. A first snapshot is taken of first system states of a computer system. The first snapshot is mapped to a first maintenance software, which is further mapped to a specific user. The computer system is instructed to install the first maintenance software in response to an installation request from the specific user. If the specific user subsequently requests that the first maintenance software be removed from the computer system, then the mappings of the first snapshot and the first maintenance software are used to revert the computer system back to the first system states.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
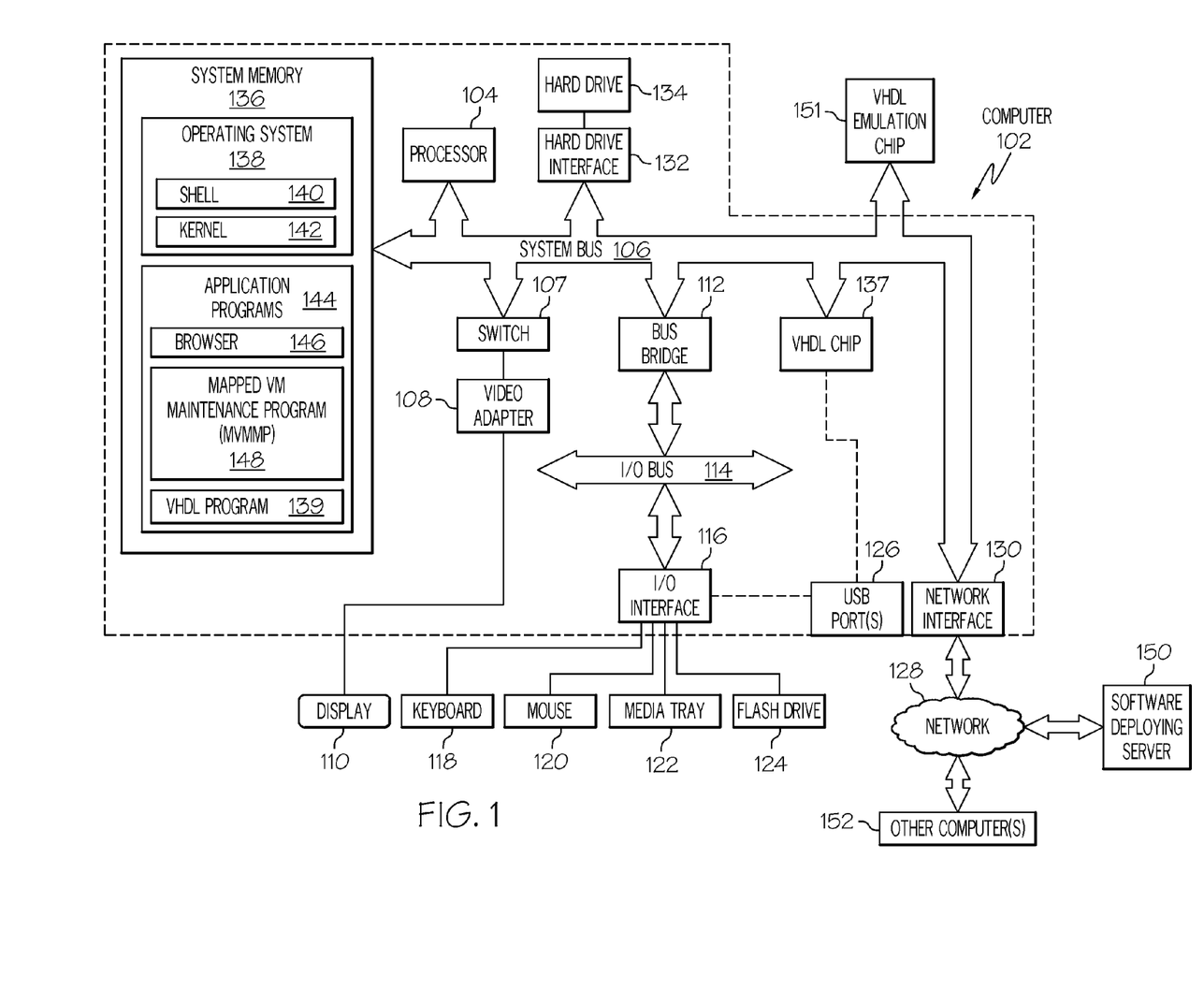
FIG. 1 depicts an exemplary computer in which the present disclosure may be implemented.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150 and other computer(s) 152, as well as hypervisor 212, fix requesting entity's computer 220, and/or any computers used in virtual machine cloud 202 shown in FIG. 2.

Computer 102 includes a processor 104 that is coupled to a system bus 106. Processor 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., mapped virtual machine maintenance program-MVMMP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a flash drive 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 and other computers 152 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory and hypervisor 212's system memory) also include mapped virtual machine maintenance program (MVMMP) 148. MVMMP 148 includes code for implementing the processes described below, including those described in FIGS. 2-3. In one embodiment, computer 102 is able to download MVMMP 148 from software deploying server 150, including in an on-demand basis. Note further that, in one embodiment of the present invention, software deploying server 150 performs all of the functions associated with the present invention (including execution of MVMMP 148), thus freeing computer 102 from having to use its own internal computing resources to execute MVMMP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from MVMMP 148 causes VHDL program 139 to configure VHDL chip 137, which may be an FPGA, ASIC, etc.

In another embodiment of the present invention, execution of instructions from MVMMP 148 results in a utilization of VHDL program 139 to program a VHDL emulation chip 151. VHDL emulation chip 151 may incorporate a similar architecture as described above for VHDL chip 137. Once MVMMP 148 and VHDL program 139 program VHDL emulation chip 151, VHDL emulation chip 151 performs, as hardware, some or all functions described by one or more executions of some or all of the instructions found in MVMMP 148. That is, the VHDL emulation chip 151 is a hardware emulation of some or all of the software instructions found in MVMMP 148. In one embodiment, VHDL emulation chip 151 is a programmable read only memory (PROM) that, once burned in accordance with instructions from MVMMP 148 and VHDL program 139, is permanently transformed into a new circuitry that performs the functions needed to perform the process described below in FIGS. 2-3.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
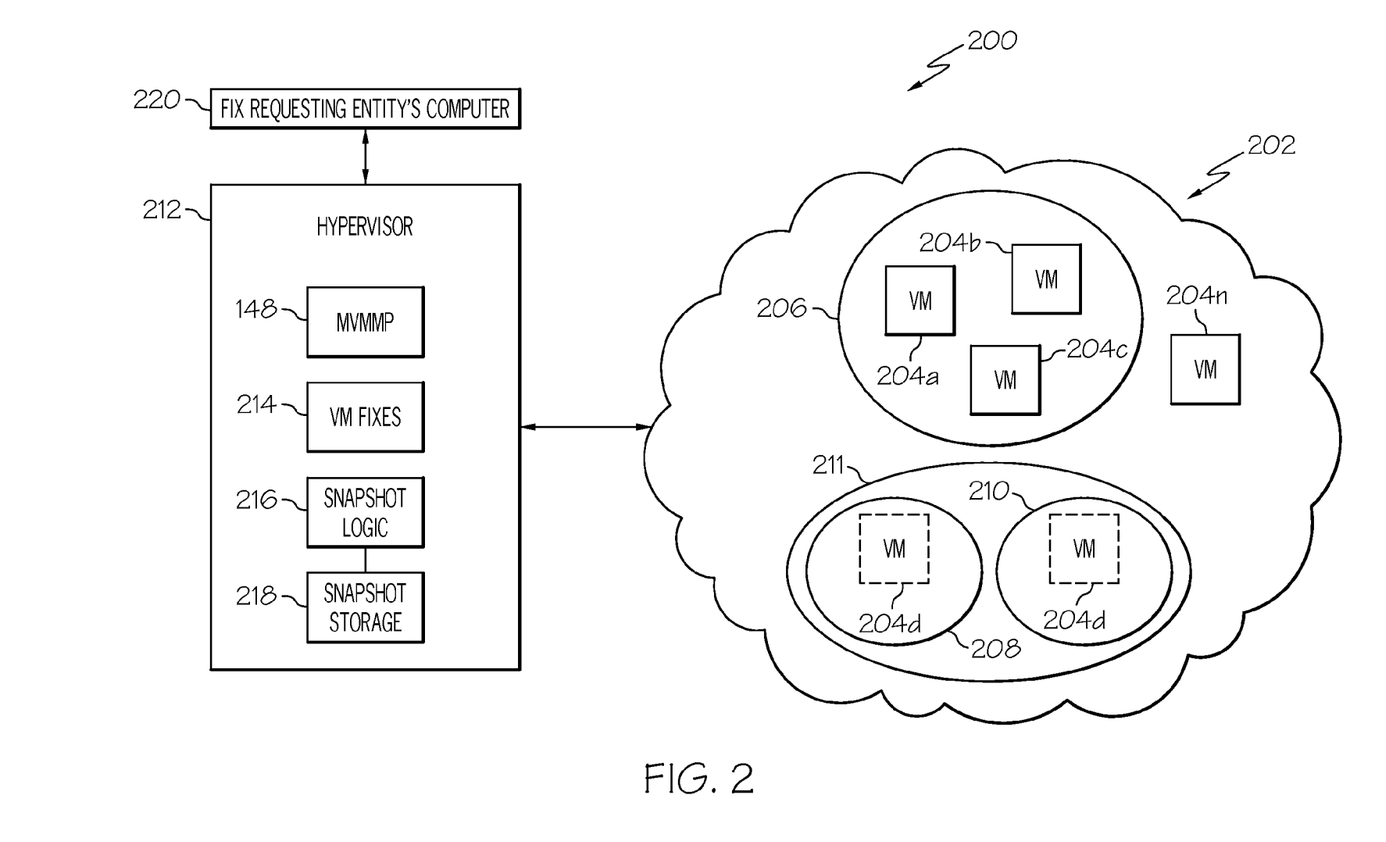
FIG. 2 illustrates an exemplary network in which the present disclosure may be implemented.

With reference now to FIG. 2, an exemplary network 200, in which the present disclosure may be implemented, is presented. A virtual machine cloud 202 is made up of one or more virtual machines 204a-n (wherein n is an integer). Note that while virtual machine cloud 202 is shown with multiple virtual machines 204, in one embodiment of the present disclosure there is only one virtual machine 204 within the virtual machine cloud 202. In either embodiment, the virtual machines 204 are software representations of hardware devices, such as computers. For example, assume that each of the virtual machines 204a-n is a software representation of a different computer. This software representation is made up of application program interfaces (APIs) and/or other software code that provide an "appearance" of an actual hardware computer, even though the virtual machine is actually just an emulation of the hardware computer. Nonetheless, this emulation is able to receive and process data, instructions, etc., just like a real computer, through such APIs and other software code. Similarly, each of the virtual machines 204 has states at any point in time. These states comprise the contents of system memory and hard drives that are emulated in the virtual machines 204.

Of course, each of the virtual machines 204 must run on a physical computer at some point. In one embodiment, multiple virtual machines run on a single physical computer. For example, virtual machines 204a-c may all run on a single physical computer 206, either under a same or different operating system. Similarly, a single virtual machine can be spread out across multiple physical computers. For example, virtual machine 204d is part of a virtual system 211, which spans across (runs on) physical computers 208 and 210, such that different aspects of the virtual machine 204d are processed on and emulated by the different physical computers 208 and 210.

In one embodiment, the virtual machine cloud 202, and the virtual machines 204a-n that reside therein, is managed by a hypervisor 212. In one embodiment, hypervisor 212 is a physical computer that creates, deploys, manages and runs the virtual machines 204a-n. In another embodiment, hypervisor 212 is implemented as a software logic. In either embodiment, hypervisor 212 is capable of utilizing multiple operating systems, configurations, applications, data storage systems, etc. for each the virtual machines 204a-n that are being supervised by the hypervisor 212. In order to accomplish this task, hypervisor 212 utilizes the MVMMP 148 depicted in FIG. 1, which includes oversight logic, creation and deployment logic, etc. Furthermore, and in accordance with the present disclosure, hypervisor 212 contains, or at least has access to, virtual machine fixes 214. These virtual machine fixes 214 are discrete units of maintenance software and other software code designed to correct a problem with (or else upgrade/update) either the software that creates/maintains/deploys one or more of the virtual machines 204a-n, or else to correct a problem with (or upgrade/update) software (e.g., applications, operating systems, firmware, etc.) that is running on one or more of the virtual machines 204a-n.

Hypervisor 212 also has access to a snapshot logic 216. Snapshot logic 216, which may actually be part of MVMMP 148, is software that allows hypervisor 212 to capture a real-time image of the system memory and/or secondary storage (e.g., a hard disk) being emulated as a component of one or more of the virtual machines 204a-n. Once such snapshots are taken, they can be stored in a snapshot storage 218, which may be a dedicated area in the hypervisor 212's system memory, hard drive, etc., or may be a separate storage device (e.g., flash drive 124 shown in FIG. 1).

Hypervisor 212 is also able to communicate with a fix requesting entity's computer 220, which is used by an entity (e.g., a specific user) who is requesting that a maintenance software (e.g., a fix) be installed on or removed from one or more of the virtual machines 204a-n.

Figure 3:
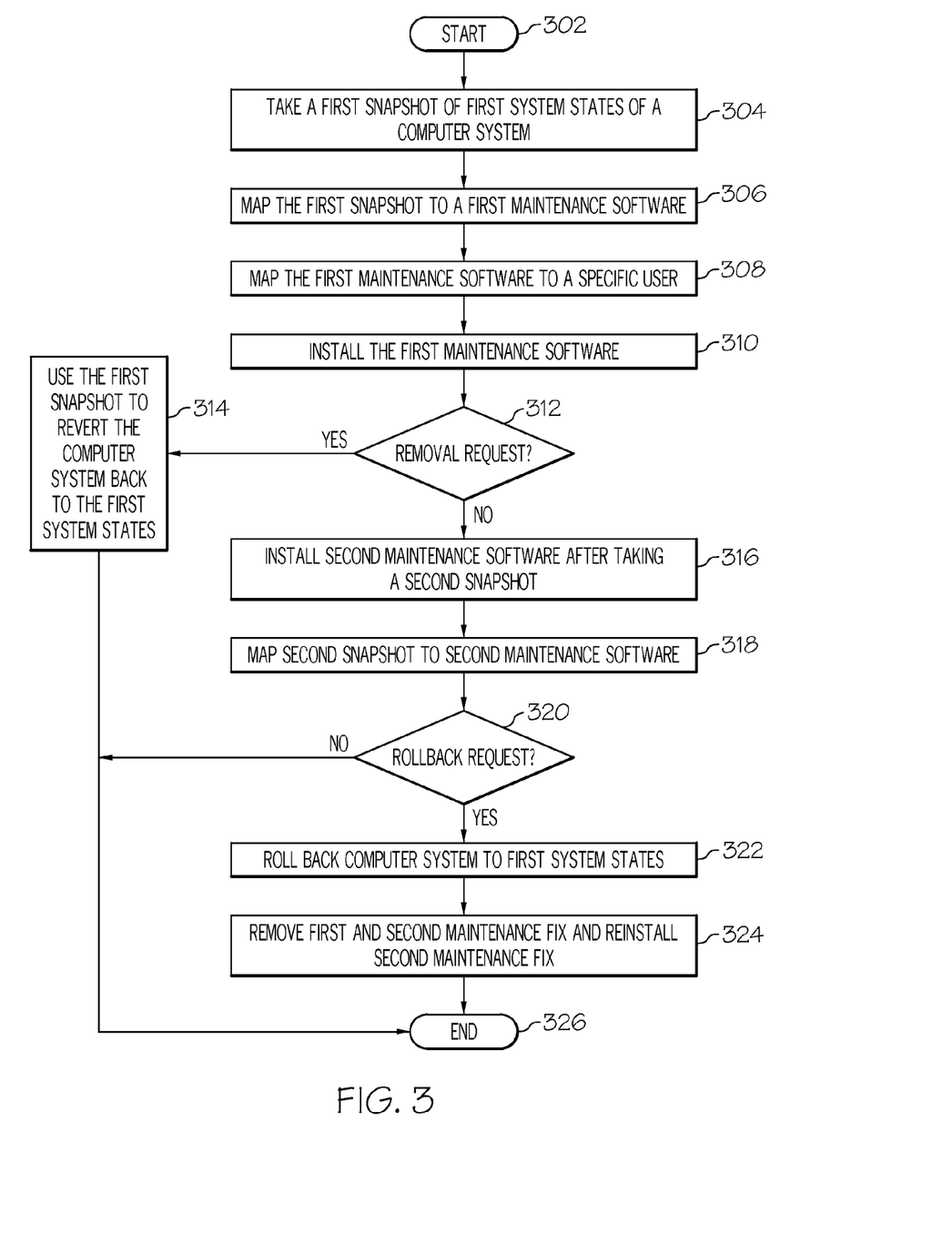
FIG. 3 is a high-level flow chart of exemplary steps taken to manage fixes in a virtual network cloud, wherein one or more of the depicted and described steps are executed by a processor.

With reference now to FIG. 3, a high level flow chart of exemplary steps taken to manage maintenance software in a computer system, such as a virtual machine cloud, is presented. Note that one or more of these steps can be executed by a processor, including but not limited to a processor located within the hypervisor 212 shown in FIG. 2. After initiator block 302, a first snapshot is taken of first system states of a computer system (block 304), which is one embodiment is a virtual machine cloud. These first system states may be for a single virtual machine or a cluster of virtual machines, and represent the contents of emulated system memory and/or emulated secondary memory (e.g., a hard disk) in the virtual machine cloud. Note that the virtual machine cloud may be multiple virtual machines, or it may be a single virtual machines. Again, note that a virtual machine is defined as a software emulation/representation of an actual computing device.

As described in block 306, the first snapshot is mapped to a first maintenance software, which in one embodiment is a software fix (e.g., from the virtual machine fixes 214 shown in FIG. 2). This mapping allows subsequent logic (e.g., MVMMP 148) to "know" that the first snapshot captured the system state of the virtual machine cloud before the first maintenance software was installed on the virtual machine cloud. A specific user (e.g., the entity/user who is using the fix requesting entity's computer 220 shown in FIG. 2) is also be mapped to the first maintenance software and/or the first snapshot (block 308). The first maintenance software is then installed on the computer system (block 310)

If a request is received (e.g., by the hypervisor 212 shown in FIG. 2), from the specific user to whom the first maintenance software has been mapped, to remove the first maintenance software (query block 312), then the first maintenance software is removed by reverting the computer system back to the first machine states that were captured by the first snapshot (block 314), and the process ends (terminator block 326). Note that in one embodiment, the request can be the result of another user asking the mapped-to specific user to make the request. That is, the specific user (to whom the first maintenance software was mapped) can receive a request from another user (who is not mapped to the first maintenance software) to roll back the system as described herein. If the specific user agrees to the other user's plea, then the specific user will send the request to remove the first maintenance software.

As described in block 316, a second maintenance software can subsequently be installed on the computer system. In one embodiment, installing the second maintenance software causes an automatic taking of a second snapshot of second system states (states that include changes made by the first maintenance software's installation) before installing the second maintenance software.

Note that in one embodiment the second maintenance software is functionally unrelated to the first maintenance software. That is, the second maintenance software is not merely a modification of the first maintenance software, but rather is a new maintenance software that has been created independently of the first maintenance software. As such, the two maintenance software may address different issues. For example, the first maintenance software may correct a problem with the creation of a particular virtual machine, while the second maintenance software may correct a problem with software running on that particular virtual machine.

As depicted in block 318, the second snapshot is mapped to the second maintenance software. If a request is received to remove the first maintenance software (query block 320), then the computer system is rolled back to the first system states (block 322). However, rolling back the computer system results in only the first maintenance software being removed, while the second maintenance software is automatically reinstalled. That is, the first and second maintenance software are removed, and then only the second maintenance software is automatically reinstalled, even though the computer system has been rolled back to the snapshot taken before the first software maintenance was installed (block 324). This allows the user to selectively add and remove maintenance software without being aware of the snapshots, which are hidden from the user. That is, the user does not need to be aware of what impact removing a piece of maintenance software will have on the computer system, since the hypervisor will automatically reinstall any subsequent states/fixes needed as a result of the earlier maintenance software being removed. By knowing the mapping schema between the first and second snapshots, as well as the first and second maintenance software, then the second maintenance software can be applied to the computer system after resetting the states of the computer system to that found in the first snapshot. Therefore, there is no state collision caused by reinstalling the second maintenance software, since it is the first snapshot, not the second snapshot, that is used to reconfigure the computer system. Note that in one embodiment, the first and second instructions described in blocks 322 and 324 are a single instruction. The process ends at terminator block 326.

Note that in one embodiment, the installation of the first and second maintenance software described in blocks 310 and 316 is prohibited unless a directive is received (e.g., by hypervisor 212) from the specific user (e.g., the entity using the fix requesting entity's computer 220 shown in FIG. 2) who is mapped to the maintenance software, and thus is secondarily mapped to the snapshots. In one embodiment, this specific user is a user of the virtual machine cloud, or alternatively, a particular virtual machine or virtual system within the virtual machine cloud. In another embodiment, the directive to roll back the system is handled by a cloud management system (e.g., using hypervisor 212), which receives requests to install/remove maintenance software from a user of the fix requesting entity's computer 220, as described above. However, in this other embodiment, the request is actually initiated by another user (not shown), who sends a request to remove a particular piece of maintenance software to the cloud management system. Since the other user is not mapped to the maintenance software being removed, and thus has no apparent authority to remove the maintenance software, the cloud management system will send a query to the specific (mapped to) user of the fix requesting entity's computer 220, asking for approval to remove the particular maintenance software. Only if the specific user, to whom the maintenance software has been mapped as described herein, authorizes the removal of that particular maintenance software will such removal proceed.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of managing maintenance software in a computer system, the computer-implemented method comprising:

a processor taking a first snapshot of first system states of a computer system;

mapping the first snapshot to a first maintenance software, wherein the computer system is a virtual computer system, and wherein the first maintenance software corrects a problem with a creation of the virtual computer system;

receiving a first installation request to install the first maintenance software in the computer system;

mapping the first maintenance software to a specific user who is authorized to install maintenance software on the computer system;

in response to a determination that the first installation request is from the specific user, instructing the computer system to install the first maintenance software in the computer system;

receiving a second installation request from the specific user to install a second maintenance software in the computer system, wherein the second maintenance software corrects a problem with software that is running on the virtual computer system;

instructing the computer system to install the second maintenance software, wherein instructing the computer system to install the second maintenance software causes an automatic taking of a second snapshot of second system states of the computer system and a subsequent installation of the second maintenance software, and wherein the second system states reflect changes made to the computer system by the first maintenance software;

mapping the second snapshot to the second maintenance software;

in response to receiving a request to remove the first maintenance software, utilizing the first snapshot and the mappings to roll back the computer system to the first system states, wherein rolling back the computer system to the first system states results in removing the first maintenance software and the second maintenance software and in an automatic reinstallation of the second maintenance software without reinstalling the first maintenance software; and automatically installing any subsequent system states and fixes needed to correct problems that resulted from removing the first maintenance software.

2. The computer-implemented method of claim 1, wherein use of the mapping of the first snapshot for said reverting the computer system back to the first system states is hidden from the specific user.

3. The computer-implemented method of claim 1, wherein the computer system is a virtual machine cloud comprising multiple virtual machines.

4. The computer-implemented method of claim 3, wherein the processor is a component of a hypervisor computer that is coupled to the virtual machine cloud, and wherein the hypervisor computer is a physical computer that configures at least one virtual machine in the virtual machine cloud.

5. The computer-implemented method of claim 3, wherein the multiple virtual machines run on different operating systems.

6. The computer-implemented method of claim 3, further comprising:

taking a second snapshot of second system states of the virtual machine cloud; and mapping the second snapshot to the second maintenance software, wherein the first and second snapshots describe respective states of virtual machines in the virtual machine cloud at a point in time during which the respective first and second snapshots were taken.

7. The computer-implemented method of claim 6, wherein the first and second system states are contents of emulated system memory and emulated hard drives in the virtual machine cloud.

8. The computer-implemented method of claim 3, wherein the first maintenance software further comprises a software fix for the virtual machine cloud.

9. The computer-implemented method of claim 3, wherein one of the multiple virtual machines is run on a virtual system that spans across multiple physical machines.

10. A computer-implemented method of managing maintenance software in a computer system, the computer-implemented method comprising:

a processor taking a first snapshot of first system states of a computer system;

mapping the first snapshot to a first maintenance software;

receiving a first installation request to install the first maintenance software in the computer system;

mapping the first maintenance software to a specific user;

in response to a determination that the first installation request is from the specific user, instructing the computer system to install the first maintenance software in the computer system;

receiving a second installation request to install a second maintenance software in the computer system;

instructing the computer system to install the second maintenance software, wherein instructing the computer system to install the second maintenance software causes an automatic taking of a second snapshot of second system states of the computer system and a subsequent installation of the second maintenance software, wherein the second system states reflect changes made to the computer system by the first maintenance software, and wherein the second maintenance software is functionally unrelated to the first maintenance software;

mapping the second snapshot to the second maintenance software;

in response to receiving a request to remove the first maintenance software, utilizing the first snapshot and the mappings to roll back the computer system to the first system states, wherein rolling back the computer system to the first system states results in removing the first maintenance software and the second maintenance software and in an automatic reinstallation of the second maintenance software without reinstalling the first maintenance software; and automatically installing any subsequent system states and fixes needed to correct problems that resulted from removing the first maintenance software.

11. A computer program product comprising a computer readable storage medium embodied therewith, the computer readable storage medium comprising:

computer readable program code configured to take a first snapshot of first system states of a computer system;

computer readable program code configured to map the first snapshot to a first maintenance software;

computer readable program code configured to receive an installation request to install the first maintenance software in the computer system;

computer readable program code configured to map the first maintenance software to a specific user;

computer readable program code configured to, in response to a determination that the installation request is from the specific user, instruct the computer system to install the first maintenance software in the computer system;

computer readable program code configured to instruct the computer system to install a second maintenance software on the computer system, wherein instructing the computer system to install the second maintenance software causes an automatic taking of a second snapshot of second system states of the computer system and a subsequent installation of the second maintenance software, wherein the second system states reflect changes made to the computer system by the first maintenance software, and wherein the second maintenance software is functionally unrelated to the first maintenance software;

computer readable program code configured to map the second snapshot to the second maintenance software;

computer readable program code configured to receive a removal request from the specific user to remove the first maintenance software from the computer system;

computer readable program code configured to revert the computer system back to the first system states in response to receiving the removal request from the specific user, wherein said reverting is accomplished through use of the mappings;

computer readable program code configured to utilize the first and second snapshots and the mappings to roll back the computer system to the first system states, wherein rolling back the computer system to the first system states results in removing the first maintenance software and the second maintenance software and in an automatic reinstallation of the second maintenance software without reinstalling the first maintenance software; and computer readable program code configured to automatically install any subsequent system states and fixes needed to correct problems that resulted from removing the first maintenance software.

12. The computer program product of claim 11, wherein use of said mapping of the first snapshot for reverting the computer system back to the first system states is hidden from the specific user.

13. The computer program product of claim 11, wherein the computer system is a virtual computer system, wherein the first maintenance software corrects a problem with a creation of the computer system, and wherein the second maintenance software corrects a problem with software that is running on the virtual computer system.

14. The computer program product of claim 11, wherein the computer system is a virtual machine cloud comprising multiple virtual machines.

15. The computer program product of claim 14, wherein the first maintenance software is a software fix for the virtual machine cloud.

16. A hypervisor computer system coupled to a virtual machine cloud, the hypervisor computer system comprising:
   a central processing unit; and
   a computer readable memory coupled to the central processing unit, wherein the computer readable memory comprises software that, when executed, causes the central processing unit to implement:
   taking a first snapshot of first system states of a computer system;
   mapping the first snapshot to a first maintenance software;
   receiving an installation request to install the first maintenance software in the computer system;
   mapping the first maintenance software to a specific user;
   in response to a determination that the installation request is from the specific user, instructing the computer system to install the first maintenance software in the computer system;
   receiving a removal request from the specific user to remove the first maintenance software from the computer system;
   reverting the computer system back to the first system states in response to receiving the removal request from the specific user, wherein said reverting is accomplished through use of the mappings of the first snapshot and the first maintenance software;
   reinstalling the first maintenance software on a virtual machine cloud to which the hypervisor computer system is coupled;
   directing the installation of a second maintenance software on the virtual machine cloud, wherein directing the installation of the second maintenance software causes an automatic taking of a second snapshot of second system states of the virtual machine cloud and a subsequent installation of the second maintenance software, wherein the second system states reflect changes made to the virtual machine cloud by the first maintenance software, and wherein the second maintenance software is functionally unrelated to the first maintenance software;
   mapping the second snapshot to the second maintenance software;
   in response to receiving a request to remove the first maintenance software from the virtual machine cloud, utilizing the first and second snapshots and the mappings to roll back the computer system to the first system states, wherein rolling back the virtual machine cloud to the first system states results in removing the first maintenance software and the second maintenance software and in an automatic reinstallation of the second maintenance software without reinstalling the first maintenance software; and
   automatically installing any subsequent system states and fixes needed to correct problems that resulted from removing the first maintenance software from the computer system.

17. The hypervisor computer system of claim 16, wherein use of said mapping of the first snapshot for reverting the virtual machine cloud back to the first system states is hidden from the specific user.

18. The hypervisor computer system of claim 16, wherein the first maintenance software corrects a problem with a creation of the virtual machine cloud, and wherein the second maintenance software corrects a problem with software that is running on the virtual machine cloud.

19. The hypervisor computer system of claim 16, wherein the virtual machine cloud comprises multiple virtual machines.

20. The computer-implemented method of claim 1, wherein the specific user is directed by an unauthorized user, via a cloud management system, to transmit the first installation request and the second installation request, wherein the unauthorized user has no apparent authority to remove maintenance software from the computer system.

* * * * *